July 5, 1938. G. T. SOUTHGATE 2,122,994
WELDED JOINT AND A METHOD OF MAKING SAME
Filed Dec. 30, 1933
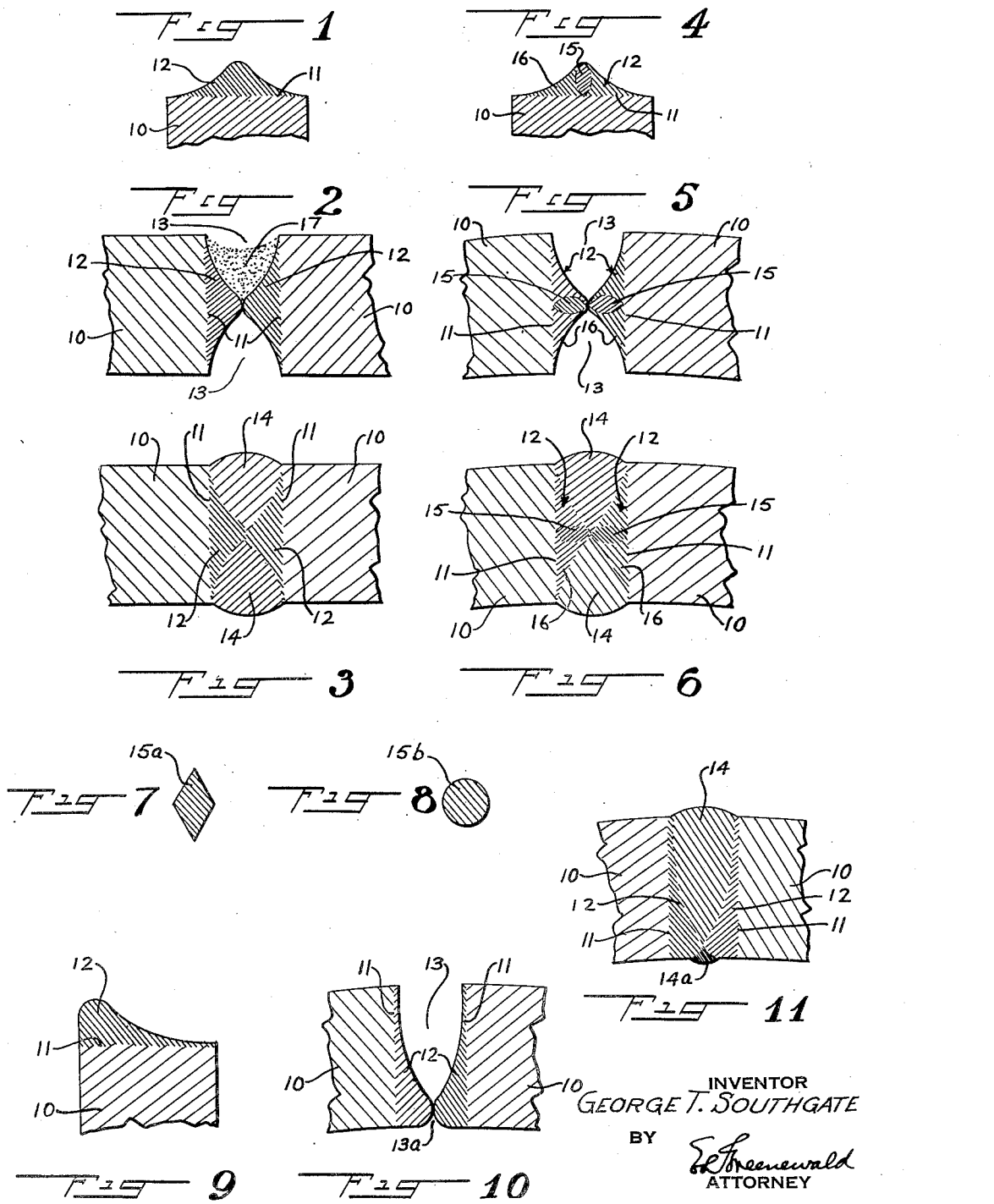
INVENTOR
GEORGE T. SOUTHGATE
BY
ATTORNEY Patented July 5, 1938

2,122,994

UNITED STATES PATENT OFFICE 2,122,994

WELDED JOINT AND A METHOD OF MAKING SAME

George T. Southgate, Forest Hills, N. Y., assignor, by mesne assignments, to Union Carbide and Carbon Corporation, a corporation of New York Application December 30, 1933, Serial No. 704,734

12 Claims. (Cl. 219—10)

This invention relates to a method of preparing the edges of metallic bodies to form a welding groove and welding the prepared edges together to produce unitary metallic bodies. The method is particularly applicable to butt welding the edge faces of thick metals by fusion welding.

In welding relatively thick metallic bodies by the fusion process of welding, the edges to be joined are prepared in such a way that a welding groove adapted to receive the deposited weld metal is formed between the edges when they are placed in position to be welded. The groove may be of a single or double V or U type. Heretofore, such grooves have been formed by cutting away portions of the faces of the edges to be joined. This operation of preparing the edges to be welded requires the use of tools such as millers, grinders or cutting torches. Such tools and apparatus are extra equipment for the welder, as they are not required in the subsequent operation of welding the edges together. The U groove is preferred to the V groove in the welding trade, particularly in welding thick metals, because it is easier to obtain a good weld at the bottom of such a groove than it is to produce a good weld at the bottom of other grooves having their side walls at the bottom more nearly vertical. In order to prepare the edges for the U type of groove, further specialization in the equipment mentioned above is required as often times the standard equipment at hand is not capable of preparing the edges of the U type groove.

Therefore, an object of this invention is to prepare the edges of the bodies to be welded with the use of welding equipment which may be used for welding the seam and thereby eliminate the necessity of using other equipment.

Regardless of the type of welding groove formed by cutting away the edges to be joined, the surface of the groove is composed of base metal. It is more difficult to form a good bond between base metal and weld metal than it is to form a good bond between previously deposited weld metal and subsequently deposited weld metal. Furthermore, the side walls of a welding groove are at an angle to the horizontal, thus further increasing the difficulty of producing a good bond between the base metal face of the welding groove and the fusion deposited filler metal, as compared to the more favorable conditions for floating slag and bonding between an upturned horizontal surface and fused weld metal deposited thereon. The beneficial conditions of welding upon an upturned horizontal surface are more nearly attained at the bottom of a U groove than in other types of welding grooves, but as the bottom of the U groove is positioned between adjacent side walls of the groove, these walls rapidly absorb the welding heat and make it difficult to fuse the bottom surface of the groove which is, of course, detrimental to good bonding. This condition which is unfavorable to the production of a good weld at the bottom of the groove is accentuated when the side walls are tall and are composed of base metal, such as has been the case heretofore in butt welding the edge faces of thick metals.

Therefore, another object of this invention is to form the more difficult bond between the base metal and the fusion deposited weld metal of a welded joint while the face of the base metal is in an upturned horizontal position in order to provide very favorable conditions for the flotation of slag, removal of included gases and good bonding.

A further object of this invention is to build up the edge faces of the parts to be joined with weld metal while the edges are not affected by heat absorption from adjacent upwardly extending side walls of a welding groove, and to build up the edges in such a manner that either a single or double V or U, or other type of groove, having at least the bottom surface of the groove composed of weld metal and preferably the side walls also composed of weld metal, is formed when the parts to be welded are placed in their welding position.

And still further, another object of this invention is to increase the rapidity of depositing and bonding the groove filler metal to the surface of the groove and thereby improve the conditions for flotation of slag and exclusion of oxygen.

The above and other objects and features of my invention will be more clearly understood from the following description and drawing: in which Fig. 1 is a fragmentary cross-sectional view of one of the parts to be welded having an edge prepared for welding in accordance with one form of this invention;

Fig. 2 is a cross-sectional view of the assembled parts to be welded shown in Fig. 1;

Fig. 3 is a cross-sectional view of the welded body disclosing the weld formed between the prepared edges;

Figs. 4 to 6 disclose a modified process of making a welded joint in which a filler and guide strip is used in the preparation of the edges to be welded. The views represent cross-sections of the edges of the parts in their several stages of manufacture into a modified welded body, which stages correspond respectively to the stages shown in Figs. 1 to 3, but in which the plates are curved to form a pressure vessel or the like.

Figs. 7 and 8 are, respectively, cross-sectional views of other modifications of filler and guide strips which may be used in the preparation of the edges to be welded; and Figs. 9 to 11 disclose another modification of the method of making a weld in which the edges are prepared to provide a single U welding groove in which a filler and guide strip may be used as desired. The views are cross-sections of the edges of the parts in their several stages of manufacture into a modified welded body, which stages correspond respectively to the stages shown in Figs. 1 to 3, but in which the plates are curved to form a pressure vessel or the like.

In accordance with my invention, the edges to be welded may be prepared by building ridges of weld metal along said edges composed completely of weld metal, or by building ridges composed partly of weld metal and partly of filler or guide strips. As shown in Figs. 1 to 6, the method is used to form a double U groove and as shown in Figs. 9 to 11, the method is used to form a single U groove, producing a modified type of joint in each illustrated example. As will hereinafter appear, this invention is also applicable to the formation of V or other types of grooves. For reasons previously discussed, the U type of groove is preferred and as it is obvious that the surface line of the groove can be controlled to form other types of welding grooves, only the U groove is illustrated herein. Referring to the method disclosed in Figs. 1 to 3, as shown in Fig. 1, the parts 10 to be united are arranged in an upright position so that the edge faces 11 are arranged in a substantially horizontal plane and a ridge of weld metal 12 is deposited upon and welded to each edge face 11. The ridge 12 preferably has a substantially triangular cross-section, one or both sides thereof being concavely curved, and the crest of the ridge preferably lies approximately within the central plane between the main faces of the part 10 to be welded. As shown in the drawing, the radius of curvature of the convex portion of the crest of the ridge is substantially smaller than one-half the thickness of the plate. The built-up ridges 12 are then placed contiguous to each other in a welding position so as to provide a double U shaped groove 13 between the metallic parts 10 to be joined. The grooves 13 are preferably arrranged in the horizontal welding position and weld metal 14 is deposited first in the upper groove and then the position of the grooves is reversed and weld metal 14 is deposited in the other groove 13 to complete the weld.

In accordance with the method disclosed in Figs. 4 to 6, the edges 11 to be welded are placed in a substantially horizontal plane and a filler or guide strip is placed lengthwise of each edge in order to reduce the amount of weld metal required to build up the ridge 12 and also to act as a guide for the height to which the ridge is built. As shown in Fig. 4, the strip 15 is of an oval shape, but other types of filler and guide strips 15a and 15b may be used as shown respectively in Figs. 7 and 8, in which the cross-section tapers from the middle point in both directions. Such strips are welded to the base metal edge 11, with the point or narrow portion of the strip resting on the face of the edge to be welded, by weld metal 16 deposited on each side of the strip. Upon preparing the edges to be welded in this manner, the crests of the ridges are placed contiguous to each other as shown in Fig. 5 to form a welding groove 13 and the weld is completed by depositing weld metal 14 in the U shaped grooves, as shown in Fig. 6. In the example shown in Figs. 4 to 6 and 9 to 11, the parts 10 are suitably curved to form a pressure vessel. The curvature may be rolled into the parts 10 before or after preparing the edges as may be desired.

Figs. 9 to 11 of the drawing are illustrative of an example of preparing the edges 11 of parts 10 to be welded together in which a ridge 12 is formed on the surface of the edge 11 by building up the ridge 12 with weld metal without or with the use of a filler and guide strip 15 similar to that shown respectively in Figs. 1 to 3 and Figs. 4 to 6. As shown in Fig. 9, the ridge 12 is built up so that its crest will be at or near the bottom surface of the parts 10 when they are arranged in position to be welded together as shown in Fig. 10. Preferably the crests of the ridges 12 are formed so that they will be located considerably nearer one main surface than the other main surface of the parts 10, whereby a main welding groove 13 is formed above the contiguous crests of the ridges 12, and a very small groove 13a is formed below the crests. This arrangement allows substantially all of the groove filler metal 14 to be deposited from one side of the seam. To insure that the groove filler metal 14 has penetrated to the bottom of the seam, and to further strengthen the seam, a comparatively small bead of weld metal 14a may be deposited in the small groove 13a.

In each of the modifications of this invention, it is desirable to clean and X-ray inspect the built up ridges 12 of deposited weld metal before the parts 10 to be joined are welded together by depositing fused metal 14 in the welding grooves 13. The cleaning removes the protective slag and oxides on the surface of the weld metal and insures a better welding surface. The cleaning may be done with a wire brush or a blast of sand directed upon the ridges 12. The X-ray inspection is preferably done after the ridges are cleaned. Any existing flaws in the ridges can be located and easily cut out and built up again with fusion deposited weld metal. Since the ridges comprise substantially one-half of the total weld metal of the joint in the case of a double groove, the X-ray inspection of the ridges will indicate the soundness of this proportion of the weld and eliminate the necessity for removing weld metal subsequently deposited in the welding groove in order to remove flaws which may be discovered in the final X-ray inspection of the completed weld.

After arranging the parts 10 to be joined in position to form the welding groove 13, sufficient slag forming material 17 is placed in the groove 13 to cover the molten metal 14 as it is deposited or poured in the welding groove 13. The groove filler metal 14 may be deposited in the grooves 13 and bonded thereto by the fusion welding process in which the surface of the groove may be fused and the filler metal may be fused and deposited therein from a rod. In order to increase the speed of applying the filler metal 14, and improve the flotation of slag and exclude oxygen to a greater extent from the weld, the groove filler metal 14 may be superheated and poured in the welding grooves 13. When the groove filler metal 14 is sufficiently superheated and the surface of the groove comprises predeposited weld metal, sufficient heat is transmitted from the groove filler metal 14 to the surface of the groove 13 to fuse the surface and form a bond between it and the poured metal. It is preferred to deposit the groove filler metal 14 from a rod heated by an electric arc.

It will be observed that in each of the examples given herein, in accordance with this invention, the fusion deposited weld metal is applied to the surface of base metal while the surface is in an upturned horizontal position, which position is the most favorable for carrying out the difficult operation of bonding the deposited weld metal to the base metal; and the metal is also deposited in the most favorable position for floating slag. It will be further observed that the welding groove may be formed with welding equipment alone, that, as the surface of the groove is formed of fusion deposited weld metal, it has a better affinity for the subsequently deposited weld metal than a groove formed of base metal, and the speed of deposition of the groove filler metal 14 may be increased due to the favorable conditions for bonding.

Other modifications of my invention and changes in the details shown may be made without departing from the scope of the invention defined in the appended claims.

I claim:

1. The method of preparing the edge face of a metallic member adapted to be welded to the edge face of another metallic member comprising placing a strip of metal lengthwise of said face, and welding said strip thereto.

2. The method of preparing the edge face of a metallic member adapted to be welded to the edge face of another metallic member comprising arranging a strip of metal, having a cross-section which tapers away from the center, so that one of the tapered edges of said strip is contiguous to and extends along said edge face, and welding said strip to said edge face by depositing weld metal on each side of said strip and said face.

3. The method of making a butt weld comprising building a ridge of weld metal along the face of each of the edges to be joined, placing the crests of said ridges contiguous to each other to provide a welding groove between the sides of said ridges, and welding said ridges together by depositing weld metal in said groove.

4. The method of making a butt weld comprising placing a guide and filler strip lengthwise of each of the opposing faces of the edges to be joined, welding said strip to said face by depositing weld metal on each side of said strip so that a ridge having its crest extending outwardly is formed along each of said edges, arranging the edges to be joined so that the crests of said ridges are contiguous to each other and so that a welding groove is formed adjacent each side of said ridges, and welding said ridges together by depositing weld metal in the groove adjacent each side of the ridge crests.

5. A method of making a butt weld between the edges of metal members which comprises uniting to and along each of said edges metal to form a ridge which has slopes concavely curved in cross section; placing the crests of said ridges contiguous to each other to provide a substantially U-shaped welding groove adjacent each side of such contiguous ridges; and fusion depositing weld metal in such grooves to provide a weld union between said edges.

6. A method of preparing the edge face of a plate for butt welding the latter to another plate, said method comprising welding to and along said face a continuous ridge of metal having concavely sloping sides.

7. A metal plate having a ridge of metal extending along and welded to the edge face thereof, said ridge being disposed between the main faces of said plate and having a concavely sloping side.

8. A metal plate as claimed in claim 7, in which said ridge is closer to one main face than to the other main face of said plate and said concavely sloping side constitutes the wider side of said ridge.

9. A metal plate prepared for welding and having a ridge of metal extending along an edge face thereof between the main parallel surfaces of said plate, said ridge being of substantially triangular form in cross section and having at the crest thereof a convex portion, the radius of curvature of said convex portion being substantially smaller than half the thickness of said plate, whereby said convex portion is adapted to make line contact with a surface against which it is abutted to form a welding groove.

10. A metal plate as claimed in claim 9, in which at least one sloping side of said ridge is concave.

11. A metal plate prepared for welding and having a ridge of metal extending along an edge face thereof, said ridge having a rounded crest which is disposed between the main faces of said plate but closer to one of said faces than the other, the longer side of said ridge being concave.

12. A metal plate prepared for welding and having a ridge of metal extending along an edge face thereof, said ridge having a rounded crest which is disposed substantially midway between the main faces of said plate, the sides of said ridge being concave.

GEORGE T. SOUTHGATE.